(12) United States Patent
Kaminsky et al.

(10) Patent No.: US 8,469,860 B1
(45) Date of Patent: Jun. 25, 2013

(54) METHOD AND APPARATUS TO REMEDIATE A CLUTCH FAULT IN A POWERTRAIN SYSTEM

(75) Inventors: Lawrence A. Kaminsky, White Lake, MI (US); Ali K. Naqvi, White Lake, MI (US); Scott T. Weisgerber, Fishers, IN (US); Jonathan M. Bolenbaugh, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/461,110

(22) Filed: May 1, 2012

(51) Int. Cl.
*B60W 10/10* (2012.01)

(52) U.S. Cl.
USPC .......................................... 477/79; 477/906

(58) Field of Classification Search
USPC ........................................ 477/79, 174, 906
See application file for complete search history.

(56) References Cited

U.S. PATENT DOCUMENTS

| | | | | |
|---|---|---|---|---|
| 5,681,241 | A  * | 10/1997 | Kubo et al. | 477/130 |
| 6,953,409 | B2 | 10/2005 | Schmidt et al. | |
| 7,529,607 | B2 * | 5/2009 | Aubert | 701/55 |
| 7,549,944 | B2 * | 6/2009 | Tabata et al. | 477/5 |
| 7,645,206 | B2 | 1/2010 | Holmes et al. | |

OTHER PUBLICATIONS

U.S. Appl. No. 13/462,553, Kaminsky, et al.

* cited by examiner

*Primary Examiner* — Edwin A Young

(57) ABSTRACT

A multi-mode transmission includes a plurality of torque transfer clutches fluidly coupled to a hydraulic circuit fluidly coupled to an independently controllable hydraulic pump. Upon detecting an un-commanded activation of one of the torque transfer clutches, operation of the hydraulic pump is disabled, allowable transmission states are identified, and the one of the torque transfer clutches is synchronized. The hydraulic pump is subsequently enabled and the transmission is operated in one of the allowable transmission states.

9 Claims, 3 Drawing Sheets

METHOD AND APPARATUS TO REMEDIATE A CLUTCH FAULT IN A POWERTRAIN SYSTEM

TECHNICAL FIELD

This disclosure is related to dynamic system controls for transmission systems for powertrain systems employing multiple torque-generative devices.

BACKGROUND

The statements in this section merely provide background information related to the present disclosure. Accordingly, such statements are not intended to constitute an admission of prior art.

Powertrain systems may be configured to transmit torque originating from multiple torque-generative devices through a transmission device to an output member that may be coupled to a driveline. Such powertrain systems include hybrid powertrain systems and extended-range electric vehicle systems. Control systems for operating such powertrain systems operate the torque-generative devices and apply torque transfer elements in the transmission to transfer torque in response to operator-commanded output torque requests, taking into account fuel economy, emissions, driveability, and other factors. Exemplary torque-generative devices include internal combustion engines and non-combustion torque machines. The non-combustion torque machines may include electric machines that are operative as motors or generators to generate a torque input to the transmission independently of a torque input from the internal combustion engine. The torque machines may transform vehicle kinetic energy transferred through the vehicle driveline to electrical energy that is storable in an electrical energy storage device in what is referred to as a regenerative operation. Known control systems monitor various inputs from the vehicle and the operator and provide operational control of the hybrid powertrain, including controlling transmission operating state and gear shifting, controlling the torque-generative devices, and regulating the electrical power interchange among the electrical energy storage device and the electric machines to manage outputs of the transmission, including torque and rotational speed.

Known transmission devices employ hydraulically-activated torque transfer clutch devices to transfer torque between the engine, the torque machines and the driveline. Operation of a powertrain system includes activating and deactivating the clutches to effect operation in selected operating states. Faults can occur that can cause a torque transfer clutch to fail in an activated state.

SUMMARY

A multi-mode transmission includes a plurality of torque transfer clutches fluidly coupled to a hydraulic circuit fluidly coupled to an independently controllable hydraulic pump. Upon detecting an un-commanded activation of one of the torque transfer clutches, operation of the hydraulic pump is disabled, allowable transmission states are identified, and the one of the torque transfer clutches is synchronized. The hydraulic pump is subsequently enabled and the transmission is operated in one of the allowable transmission states.

BRIEF DESCRIPTION OF THE DRAWINGS

One or more embodiments will now be described, by way of example, with reference to the accompanying drawings, in which.

DETAILED DESCRIPTION

Figure 1:
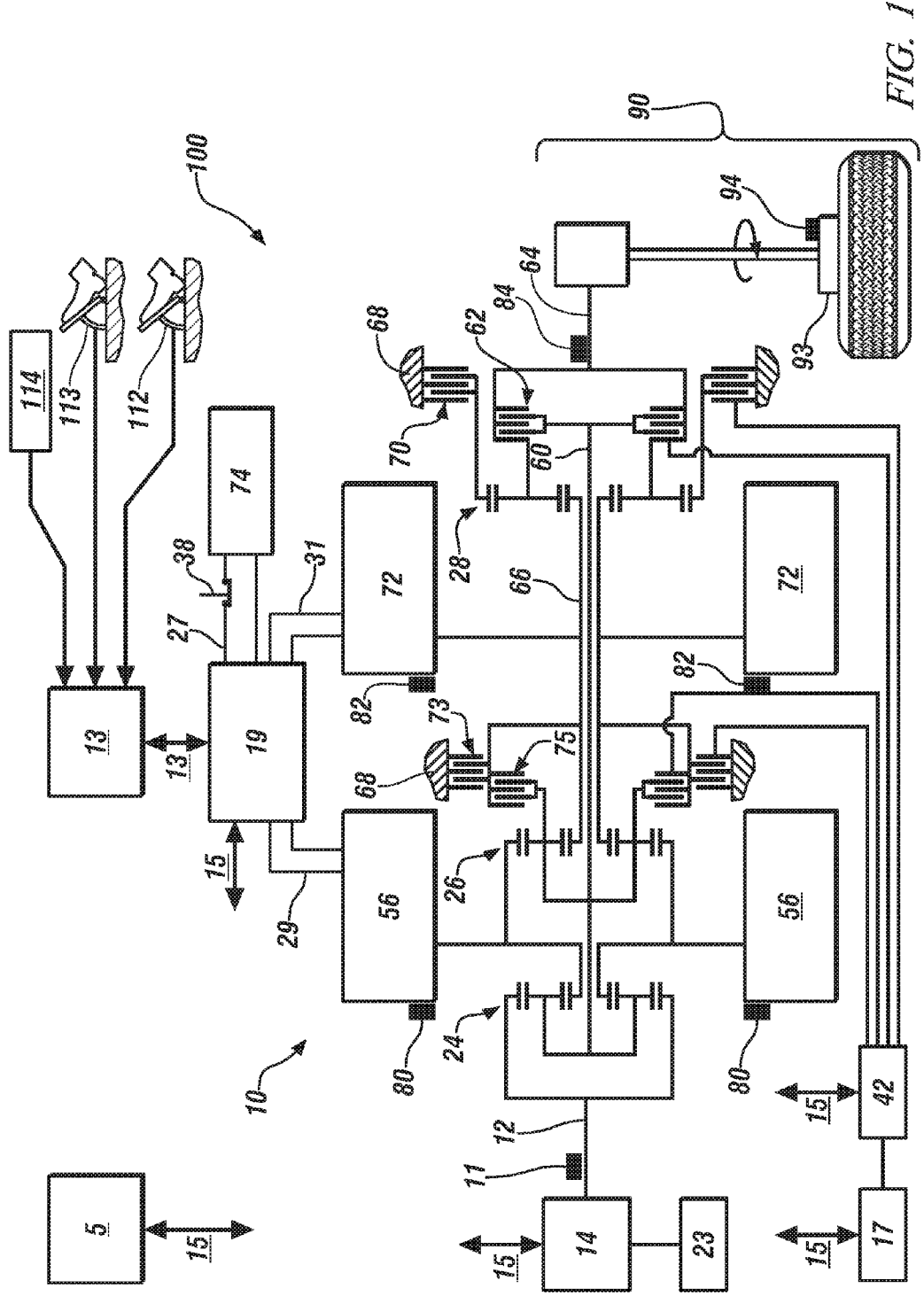
FIG. 1 illustrates a powertrain system including an internal combustion engine, an electro-mechanical transmission, a driveline, and a controller in accordance with the disclosure.

Referring now to the drawings, wherein the showings are for the purpose of illustrating certain exemplary embodiments only and not for the purpose of limiting the same, FIG. 1 depicts a powertrain system including an internal combustion engine (engine) 14, a multi-mode electro-mechanical transmission (transmission) 10, a driveline 90, and a controller 5. The transmission 10 employs an independently controllable hydraulic pump (hydraulic pump) 17 that operates independently of the operations of the engine 14 and the transmission 10. As described, the hydraulic pump 17 is a single pump element coupled to a controllable electric motor. It is appreciated that the hydraulic pump 17 may be alternately configured, including with multiple independently controllable hydraulic pump elements and motors. The transmission 10 mechanically couples to the engine 14 and includes first and second torque machines 56 and 72 that are electric motor/generators in one embodiment. The engine 14 and first and second torque machines 56 and 72 each generate torque that can be transferred to the transmission 10. The engine 14, torque machines 56 and 72, and transmission 10 illustrate an embodiment of a powertrain system that employs the hydraulic pump 17. Alternate powertrain systems may employ the independently controllable hydraulic pump 17 described herein to similar effect.

The engine 14 may be any suitable combustion device, and includes a multi-cylinder internal combustion engine selectively operable in various states to transfer torque to the transmission 10 via an input member 12, and can be either a spark-ignition or a compression-ignition engine. The engine 14 includes a crankshaft operatively coupled to the input member 12 of the transmission 10. A rotational speed sensor 11 monitors rotational speed of the input member 12. Power output from the engine 14, i.e., rotational speed and engine torque, can differ from the input speed and the input torque to the transmission 10 due to placement of torque-consuming components on the input member 12 between the engine 14 and the transmission 10, e.g., a torque management device.

The illustrated transmission 10 is a synchronous two-mode, compound-split, electro-mechanical transmission 10 that includes three planetary-gear sets 24, 26 and 28, and four engageable torque transferring devices, i.e., clutches C1 70, C2 62, C3 73, and C4 75. Other multi-mode transmissions may instead be employed. As used herein, clutches refer to torque transfer devices that can be hydraulically applied in response to a control signal, and may be any suitable devices including by way of example single- or compound-plate clutches or clutch packs, one-way clutches, band clutches and brakes. Preferably the clutches are synchronously applied, meaning that the rotational speeds of opposed clutch plates are at the same rotational speed prior to applying hydraulic pressure to activate the clutch to carry torque. There may be specific instances in which clutch activation occurs asynchronously, albeit at a cost and a risk of increased temperature with corresponding effect on clutch service life. A hydraulic circuit 42 is configured to control clutch states of each of the clutches, with pressurized hydraulic fluid supplied by the hydraulic pump 17 that is operatively controlled by the controller 5 employing a pulse-width modulated control signal or another suitable pump control scheme that generates a control signal to operate the hydraulic pump 17 at a predetermined speed (RPM), flowrate (Us), or pressure (kPa) in response to system commands. Clutches C2 62 and C4 75 are hydraulically-applied rotating friction clutches. Clutches C1 70 and C3 73 are hydraulically-controlled brake devices that can be grounded to a transmission case 68. Each of the clutches C1 70, C2 62, C3 73, and C4 75 is hydraulically applied using pressurized hydraulic fluid supplied by the hydraulic control circuit 42 in this embodiment. The hydraulic circuit 42 employs solenoid-controlled valves that are operatively controlled by the controller 5 to activate and deactivate the aforementioned clutches. The hydraulic circuit 42 further provides hydraulic fluid for cooling and lubricating elements of the transmission and provides hydraulic fluid for cooling the first and second torque machines 56 and 72. Hydraulic pressure in the hydraulic circuit 42 may be determined by measurement using pressure sensor(s), by estimation using on-board algorithms, or using other suitable methods.

The first and second torque machines 56 and 72 are three-phase AC motor/generator machines, each including a stator and a rotor, and respective resolvers 80 and 82. The motor stator for each machine is grounded to an outer portion of the transmission case 68, and includes a stator core with coiled electrical windings extending therefrom. The rotor for the first torque machine 56 is supported on a hub plate gear that is operatively attached to shaft 60 via the second planetary gear set 26. The rotor for the second torque machine 72 is fixedly attached to a sleeve shaft hub 66. Each of the resolvers 80 and 82 is signally and operatively connected to a transmission power inverter control module (TPIM) 19, and each senses and monitors rotational position of the resolver rotor relative to the resolver stator, thus monitoring rotational position of respective ones of first and second torque machines 56 and 72. Additionally, the signals output from the resolvers 80 and 82 may be used to determine rotational speeds for first and second torque machines 56 and 72.

The transmission 10 includes an output member 64, e.g. a shaft, which is rotatably connected to the driveline 90 to provide output power to the driveline 90 that is transferred to vehicle wheels 93, one of which is shown in FIG. 1. The output power at the output member 64 is characterized in terms of an output rotational speed and an output torque. A transmission output speed sensor 84 monitors rotational speed and rotational direction of the output member 64. Each of the vehicle wheels 93 is preferably equipped with a sensor 94 adapted to monitor wheel speed to determine vehicle speed, and absolute and relative wheel speeds for braking control, traction control, and vehicle acceleration management.

The input torque from the engine 14 and the motor torques from the first and second torque machines 56 and 72 are generated as a result of energy conversion from fuel or electrical potential stored in an electrical energy storage device (ESD) 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 preferably includes a pair of power inverters and respective motor control modules configured to receive torque commands and control inverter states therefrom for providing motor drive or regeneration functionality to meet the motor torque commands. The power inverters include complementary three-phase power electronics devices, and each includes a plurality of insulated gate bipolar transistors for converting DC power from the ESD 74 to AC power for powering respective ones of the first and second torque machines 56 and 72, by switching at high frequencies. The insulated gate bipolar transistors form a switch mode power supply configured to receive control commands. There is a pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second torque machines 56 and 72 for operation as motors or generators via transfer conductors 29 and 31 respectively.

The TPIM 19 transfers electrical power to and from the first and second torque machines 56 and 72 through the pair of power inverters and respective motor control modules in response to the motor torque commands. Electrical current is transmitted to and from the ESD 74 in accordance with whether the ESD 74 is being charged or discharged.

The controller 5 signally and operatively links to various actuators and sensors in the powertrain system via a communications link 15 to monitor and control operation of the powertrain system, including synthesizing information and inputs, and executing algorithms to control actuators to meet control objectives related to fuel economy, emissions, performance, drivability, and protection of hardware, including batteries of ESD 74 and the first and second torque machines 56 and 72. The controller 5 is a subset of an overall vehicle control architecture, and provides coordinated system control of the powertrain system. The controller 5 may include a distributed control module system that includes individual control modules including a supervisory control module, an engine control module, a transmission control module, a battery pack control module, and the TPIM 19. A user interface 13 is preferably signally connected to a plurality of devices through which a vehicle operator directs and commands operation of the powertrain system. The devices preferably include an accelerator pedal 113, an operator brake pedal 112, a transmission range selector 114 (PRNDL), and a vehicle speed cruise control. The transmission range selector 114 may have a discrete number of operator-selectable positions, including the rotational direction of the output member 64 to enable one of a forward and a reverse direction. The user interface 13 may include a single device, as shown, or alternatively may include a plurality of user interface devices directly connected to individual control modules.

The aforementioned control modules communicate with other control modules, sensors, and actuators via the communications link 15, which effects structured communication between the various control modules. The specific communication protocol is application-specific. The communications link 15 and appropriate protocols provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, including direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The transmission 10 is configured to operate in one of several states that can be described in terms of engine states including one of an engine-on state (ON) and an engine-off state (OFF), and transmission states including fixed gear and variable (EVT) modes, described with reference to Table 1, below.

TABLE 1

| Description | Engine State | Transmission State | Applied Clutches | |
|---|---|---|---|---|
| M1_Eng_Off | OFF | EVT Mode 1 | C1 70 | |
| M1_Eng_On | ON | EVT Mode 1 | C1 70 | |
| G1 | ON | Fixed Gear Ratio 1 | C1 70 | C4 75 |
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |
| Neutral | ON/OFF | Neutral | — | — |

The transmission states described in Table 1 indicate the specific applied one(s) of clutches C1 70, C2 62, C3 73, and C4 75 for each of the states. For purposes of this description, when the engine state is OFF, the engine input speed is equal to 0 RPM, i.e., the engine crankshaft is not rotating. A fixed gear operation provides a fixed ratio operation of input-to-output speed of the transmission 10. In response to operator input via the accelerator pedal 113, the brake pedal 112, and the transmission range selector 114, as captured by the user interface 13, the control module 5 determines torque commands to control the torque actuators including the engine 14 and the first and second torque machines 56 and 72 to meet the output torque request at the output member 64 for transference to the driveline 90.

Figure 2:
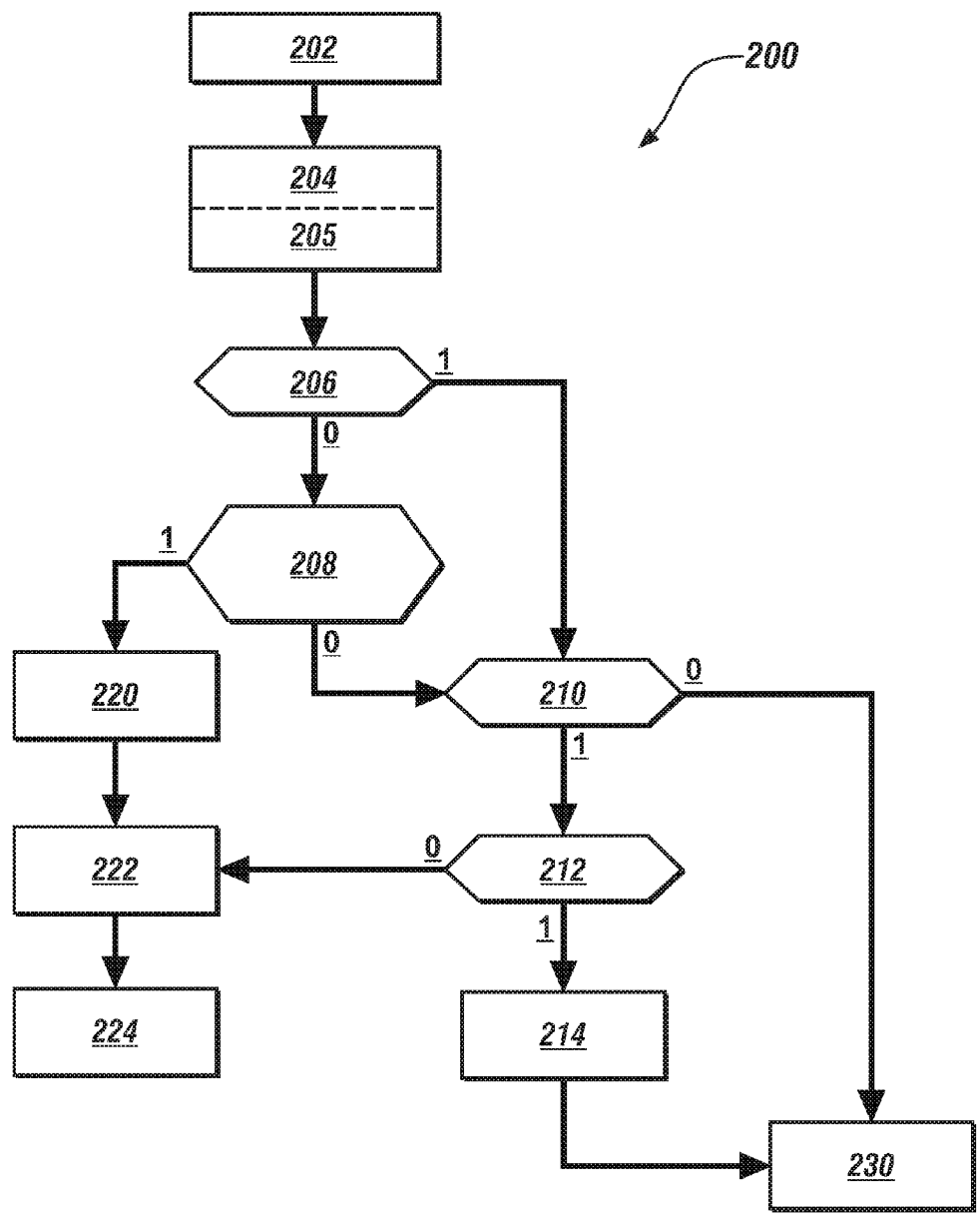
FIG. 2 illustrates a control scheme 200 in flowchart form for controlling operation of a hydraulic pump in response to a detection of a clutch fault that results in activating one of the torque transfer clutches in accordance with the disclosure.

FIG. 2 schematically shows a control scheme 200 in flowchart form for controlling operation of the hydraulic pump 17 to provide pressurized hydraulic fluid to the hydraulic circuit 42 of the transmission 10, including controlling operation of the hydraulic pump 17 in response to a detection of a clutch fault that results in activating one of the torque transfer clutches. The control scheme 200 is described in context of the powertrain system of FIG. 1, but is applicable to other powertrain systems configured to hydraulically activate torque transfer clutches to effect operation in one or more transmission states. The control scheme 200 is periodically executed during one of the loop cycles with progressive execution of specific elements of the control scheme 200 occurring during successive iterations in response to a detected clutch fault. Table 2 provides a key wherein the numerically labeled blocks and the corresponding functions are set forth as follows.

TABLE 2

| BLOCK | BLOCK CONTENTS |
|---|---|
| 202 | Clutch fault detected |
| 204 | Identify allowable transmission states |
| 205 | Select preferred transmission state |
| 206 | Is faulty clutch synchronized? |
| 208 | Is pump intervention required? |
| 210 | Is pump intervention active? |
| 212 | Are all clutches released? |
| 214 | Re-enable pump activation |
| 220 | Indicate active pump intervention and disable the hydraulic pump |
| 222 | Synchronize faulty clutch elements |
| 224 | Adjust shift path |
| 230 | Execute shift path |

During ongoing powertrain operation, a system or component fault may result in one of the clutches achieving an un-commanded activated state, referred to herein as a faulty clutch (202). A faulty clutch may be indicated by a fault in a solenoid valve in the hydraulic circuit, or may be indicated with a hydraulic pressure switch, or may be indicated a speed mismatch of transmission elements, e.g., a mismatch in the input speed, output speed and motor speeds of the first and second torque machines, or may be indicated by another suitable monitoring scheme that detects oncoming occurrence of a fault that results in the aforementioned clutch being in an un-commanded activated state. Upon detecting a faulty clutch, all allowable transmission states are identified (204). The allowable transmission states preferably include only those transmission states that are achievable when the faulty clutch is in an activated state. A preferred one of the allowable transmission states is selected based upon operating conditions, wherein the preferred one of the allowable transmission states is associated with meeting torque requirements in response to an output torque request (205).

Upon detecting the occurrence of a faulty clutch, it is determined whether the elements of the faulty clutch have been synchronized, preferably by monitoring speeds of various rotating elements of the transmission including the input speed, output speed, and motor speeds of the first and second torque machines (206). When the faulty clutch has not been synchronized (206)(0), it is determined whether a pump intervention is required in view of possible consequences associated with allowing the faulty clutch to activate prior to synchronization (208). The previous operation has indicated that a fault will cause one of the clutches to activate, and that such clutch activation is going to occur with or without synchronization of the elements of the faulty clutch. The purpose of executing this analysis is to decide whether synchronization is desirable to prevent or mitigate effects of asynchronously activating the faulty clutch. Such effects include unexpected driveline torque disturbances and thermal damage to the faulty clutch. Upon determining that there is a need for clutch synchronization, activation of the hydraulic pump 17 is disabled (pump intervention) (208)(1) by commanding the pump control signal to discontinue operating the hydraulic pump 17, i.e., operating at 0 RPM or 0 kPa pressure (220). The control system actively performs a shift to a neutral state in which all clutches are released. This includes commanding deactivation of all of the clutches (222). The control system actively controls operation of the powertrain system to synchronize the elements of the faulty clutch subsequent to disabling the hydraulic pump 17 and adjusts the shift path such that it is performed through a state in which all the clutches are commanded to be released or deactivated (224). The present iteration of the control scheme 200 then ends.

When the faulty clutch has been synchronized (206)(1), or when clutch synchronization has not occurred with the faulty clutch (206)(0) and it is determined that a pump intervention is not required (208)(0), it is next determined whether a pump intervention requested during a previous iteration of the control scheme 200 remains active (210). If so, (210)(1), it is determined whether the transmission has achieved an operating state in which all of the clutches are deactivated, which is due in part to a decrease in hydraulic pressure associated with deactivation of the hydraulic pump 17 (212). When the transmission has not achieved an operating state in which all of the clutches are released due to decrease in hydraulic pressure (212)(0), the control system actively performs the shift to a neutral state in which all clutches are released or deactivated. This includes commanding deactivation of all of the clutches (222). The control system actively controls operation of the powertrain system to synchronize the elements of the faulty clutch subsequent to disabling the hydraulic pump 17 and adjusts the shift path such that it is performed through a neutral state in which all the clutches are commanded to be released or deactivated (224). The present iteration of the control scheme 200 then ends.

When the transmission has achieved an operating state in which all of the clutches are released due to decrease in hydraulic pressure (212)(1), the active pump intervention is canceled, and operation of the hydraulic pump 17 is re-enabled (214).

Subsequent to re-enabling operation of the hydraulic pump (214), or when the previously requested pump intervention is active (210)(0), a shift path determination scheme is executed that targets operating the transmission in achievable states, and avoids those states in which all the clutches are released (230). This includes permitting operation only in states in which the faulty clutch is applied or activated. The present iteration of the control scheme 200 then ends. Another iteration of the control scheme 200 executes during the subsequent loop cycle.

In its most direct execution, the control scheme 200 operates as follows upon detecting a fault resulting in un-commanded activation of one of the torque transfer clutches in the transmission. Initially, allowable transmission states in which the faulty torque transfer clutch is activated are identified, and the hydraulic pump is disabled. The faulty torque transfer clutch is synchronized while the hydraulic pump is disabled. Operating the hydraulic pump is re-enabled, and operation of the transmission is executed in one of the allowable transmission states.

Figure 3:
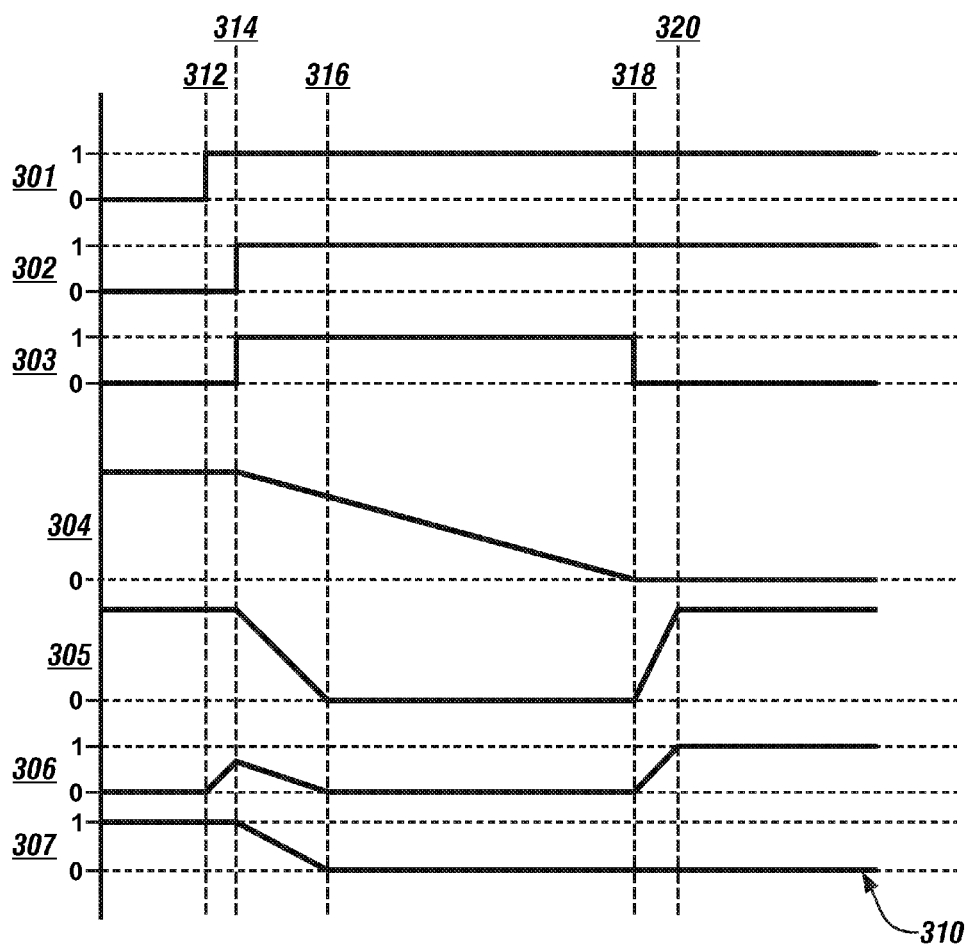
FIG. 3 illustrates a plurality of states associated with executing the control scheme 200 in the powertrain system 100 including controlling operation of an electrically-powered hydraulic pump to provide pressurized hydraulic fluid to the transmission in response to a fault, in accordance with the disclosure.

FIG. 3 graphically shows a plurality of states associated with transmission operation in relation to time 310, and depicts states associated with executing the aforementioned control scheme 200 in the powertrain system 100 including controlling operation of the hydraulic pump 17 to provide pressurized hydraulic fluid to the hydraulic circuit 42 of the transmission 10. Such operation includes operating in response to a detection of a clutch fault that causes activation of one of the torque transfer clutches. The states associated with transmission operation include clutch fault occurrence 301, clutch fault detection 302, pump control intervention 303, clutch slip speed 304, hydraulic pump speed 305, status of clutch C1 (faulty) 306, and status of clutch C2 (non-faulty) 307.

Prior to time 312, clutch C2 is activated 307(1) and clutch C1 is not activated 306(0), and thus the illustrated powertrain system 100 is operating in EVT Mode 2. At time 312, a fault occurs, indicated by a step-change in the clutch fault occurrence 301(0 to 1). Clutch C1 begins to activate due to the fault, as indicated by a change in the status of clutch C1, which increases from the non-activated state 306(0) towards an activated state 306(1) as hydraulic pressure builds in the clutch. At time 314, the clutch fault detection detects a fault 302(0 to 1) and the control scheme 200 begins pump control intervention 303(0 to 1), which includes deactivating the hydraulic pump 17. The hydraulic pump speed 305 decreases in response to the deactivation of the hydraulic pump 17 and the clutch slip speed 304 of clutch C1 decreases. Clutch C1306 and clutch C2 307 correspondingly reduce from activated states to deactivated states with the decrease in the hydraulic pump speed 305, and are completely deactivated at time 316. At time 318, the clutch slip speed 304 of the faulty clutch C1 achieves 0 RPM, indicating that the elements of the faulty clutch are synchronized. When the elements of the faulty clutch are synchronized, the activation of the hydraulic pump 17 is re-enabled by disabling the pump control intervention 303(1 to 0), which includes reactivating the hydraulic pump 17, with a corresponding increase in the hydraulic pump speed 305, thus operating the hydraulic pump 17. The faulty clutch C1 activates as indicated by a change in its status 306 (0 to 1), and the powertrain system 100 begins operating in EVT Mode 1. Such operation continues until resolution of the faulty clutch C1 is addressed and/or rectified. The clutch C2 remains deactivated at this point, although it may be later activated in response to a command to operate in fixed gear G2.

Thus, control of the electric hydraulic pump may be employed to remediate un-commanded oncoming clutch failures, thus extending operation availability while reducing risk of damage to the transmission and reducing associated costs of a repair. When the transmission is configured with only an independently controllable hydraulic pump without a mechanical pump, redundant valves for blocking oil flow may be eliminated in the hydraulic circuit 42, thus reducing part count and complexity of the transmission design.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling a multi-mode transmission including a plurality of torque transfer clutches fluidly coupled to a hydraulic circuit fluidly coupled to an independently controllable hydraulic pump, the method comprising:
   upon detecting an un-commanded activation of one of said torque transfer clutches:
      disabling operation of the hydraulic pump;
      identifying allowable transmission states;

synchronizing said one of said torque transfer clutches; and enabling operation of the hydraulic pump and operating the transmission in one of the allowable transmission states.

2. The method of claim 1, wherein disabling operation of the hydraulic pump comprises commanding a pump control signal to operate the hydraulic pump at a pump speed of 0 RPM.

3. The method of claim 1, wherein identifying allowable transmission states comprises identifying transmission states in which include activation of said one of said torque transfer clutches.

4. The method of claim 1, wherein synchronizing said one of said torque transfer clutches comprises shifting to a neutral state in which all of the torque transfer clutches are deactivated and controlling rotational speeds of elements of said one of said torque transfer clutches.

5. A method for controlling a multi-mode transmission including a plurality of torque transfer clutches fluidly coupled to a hydraulic circuit fluidly coupled to an independently controllable hydraulic pump, the method comprising:

upon detecting a fault resulting in un-commanded activation of one of the torque transfer clutches:

identifying allowable transmission states including transmission states in which the one of the torque transfer clutches is activated;

disabling operation of the hydraulic pump;

synchronizing the one of the torque transfer clutches; and subsequent to synchronization of said one of the torque transfer clutches, enabling operation of the hydraulic pump and executing a shift path that includes operating the transmission only in the allowable transmission states.

6. The method of claim 5, wherein synchronizing the one of the torque transfer clutches comprises deactivating all of the torque transfer clutches subsequent to disabling operation of the hydraulic pump.

7. The method of claim 5, wherein synchronizing the one of the torque transfer clutches comprises controlling rotational speeds of elements of the one of the torque transfer clutches.

8. The method of claim 5, wherein disabling operation of the hydraulic pump comprises commanding a pump control signal to operate the hydraulic pump at a pump speed of 0 RPM.

9. A method for controlling a multi-mode transmission including a plurality of torque transfer clutches fluidly coupled to a hydraulic circuit fluidly coupled to an independently controllable hydraulic pump, comprising:

detecting a condition corresponding to un-commanded activation of one of said torque transfer clutches;

identifying allowable transmission states including transmission states in which the one of said torque transfer clutches is activated;

determining whether the one of said torque transfer clutches is initially synchronized subsequent to detection of said condition;

if the one of said torque transfer clutches is initially synchronized, executing a shift path that includes operating the transmission only in the allowable transmission states; and if the one of said torque transfer clutches is not initially synchronized, determining whether it is desirable to synchronize the one of said torque transfer clutches prior to executing a shift path that includes operating the transmission only in the allowable transmission states;

if it is desirable to synchronize the one of said torque transfer clutches prior to executing a shift path that includes operating the transmission only in the allowable transmission states, disabling operation of the hydraulic pump, synchronizing the one of said torque transfer clutches, and executing a shift path that includes operating the transmission only in the allowable transmission states; and if it is not desirable to synchronize the one of said torque transfer clutches prior to executing a shift path that includes operating the transmission only in the allowable transmission states, executing a shift path that includes operating the transmission only in the allowable transmission states.

* * * * *